United States Patent
Mao et al.

(10) Patent No.: US 9,311,159 B2
(45) Date of Patent: Apr. 12, 2016

(54) SYSTEMS, METHODS, AND ARTICLES OF MANUFACTURE TO PROVIDE CLOUD RESOURCE ORCHESTRATION

(75) Inventors: Yun Mao, Jersey City, NJ (US); Changbin Liu, Philadelphia, PA (US); Boon Thau Loo, Cherry Hill, NJ (US); Jacobus Van der Merwe, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 190 days.

(21) Appl. No.: 13/285,925

(22) Filed: Oct. 31, 2011

(65) Prior Publication Data

US 2013/0111033 A1 May 2, 2013

(51) Int. Cl.
| | | |
|---|---|---|
| *G06F 15/173* | (2006.01) | |
| *G06F 9/50* | (2006.01) | |
| *G06F 9/48* | (2006.01) | |
| *G06F 9/455* | (2006.01) | |

(52) U.S. Cl.
CPC .......... *G06F 9/5072* (2013.01); *G06F 9/45558* (2013.01); *G06F 9/4856* (2013.01)

(58) Field of Classification Search
CPC . G06F 9/5072; G06F 9/45558; G06F 9/4856; G06F 2009/4557
USPC .................................................. 709/223, 226
See application file for complete search history.

(56) References Cited

U.S. PATENT DOCUMENTS

| | | | |
|---|---|---|---|
| 8,341,626 | B1 * | 12/2012 | Gardner et al. ................... 718/1 |
| 2010/0050172 | A1 | 2/2010 | Ferris |
| 2010/0057831 | A1 | 3/2010 | Williamson |
| 2010/0153482 | A1 | 6/2010 | Kim et al. |
| 2010/0319004 | A1 | 12/2010 | Hudson et al. |
| 2011/0072486 | A1 | 3/2011 | Hadar et al. |
| 2011/0138050 | A1 | 6/2011 | Dawson et al. |
| 2011/0173038 | A1 | 7/2011 | Moon et al. |
| 2011/0173626 | A1 | 7/2011 | Chi et al. |
| 2011/0185014 | A1 | 7/2011 | Eccles |
| 2011/0197097 | A1 | 8/2011 | Beaty et al. |
| 2011/0276951 | A1 * | 11/2011 | Jain ............................... 717/140 |
| 2011/0295986 | A1 * | 12/2011 | Ferris et al. ................... 709/222 |
| 2012/0089726 | A1 * | 4/2012 | Doddavula .................... 709/224 |
| 2012/0131176 | A1 * | 5/2012 | Ferris et al. ................... 709/224 |
| 2012/0151474 | A1 * | 6/2012 | Biran et al. ....................... 718/1 |

OTHER PUBLICATIONS

Agarwal et al., "Volley: Automated Data Placement for Geo-Distributed Cloud Services", NSDI'10, Apr. 28, 2010, (16 pages).
Al-Fares et al., "Hedera: Dynamic Flow Scheduling for Data Center Networks", NSDI'10, Apr. 28, 2010, (15 pages).

(Continued)

*Primary Examiner* — Brian J Gillis
*Assistant Examiner* — Shean Tokuta
(74) *Attorney, Agent, or Firm* — Hartman & Citrin LLC

(57) ABSTRACT

Systems, methods, and articles of manufacture to provide cloud resource orchestration are disclosed. An example method includes converting, with a processor, a plurality of constraints and a goal for a cloud deployment into a constraint optimization problem, calculating, with the processor, a solution for the constraint optimization problem, and generating instructions to perform cloud resource orchestration for the cloud deployment based on the solution of the constraint optimization problem.

20 Claims, 7 Drawing Sheets

(56) References Cited

OTHER PUBLICATIONS

Campbell et al., "Open Cirrus Cloud Computing Testbed: Federated Data Centers for Open Source Systems and Service Research", LABS, Jun. 6, 2009, (6 pages).
Chen et al., "Declarative Configuration Management for Complex And Dynamic Networks", ACM CoNEXT, Nov. 30, 2010 (12 pages).
Chen et al., "Shadow Net: A Platform for Rapid and Safe Network Evolution", USENIX ATC'09, Jun. 14, 2009, (14 pages).
Chun et al., "CloneCloud: Elastic Execution between Mobile Device and Cloud", EuroSys'11, Salzburg, Austria, Apr. 10, 2011, (14 pages).
Das et al., "LiteGreen: Saving Energy in Networked Desktops Using Virtualization", USENIX ATC'10, Apr. 28, 2010, (15 pages).
Hajjat et al., "Cloudward Bound: Planning for Beneficial Migration of Enterprise Applications to the Cloud", SIGCOMM'10, New Delhi, India, Aug. 30, 2010, (12 pages).
Henzinger et al., "FlexPRICE: Flexible Provisioning of Resources in a Cloud Environment", IST Austria, Jul. 5, 2010, (8 pages).
Henzinger et al., "A Marketplace for Cloud Resources", EMSOFT'10, Scottsdale, Arizona, Oct. 24, 2010, (7 pages).
Curino et al., "Workload-Aware Database Monitoring and Consolidation", SIGMOD'11, Athens, Greece, Jun. 12, 2011, (12 pages).
Liu et al., "Cloud Resource Orchestration: A Data-Centric Approach", CIDR'11, Asilomar, California, Jan. 9, 2011, (8 pages).
Loo et al., "Declarative Networking", ACM, Nov. 1, 2009, (9 pages).
Liu et al., "Recursive Computation of Regions and Connectivity in Networks", University of Pennsylvania, Mar. 29, 2008, (12 pages).
Narain et al., "Declarative Infrastructure Configuration Synthesis and Debugging", Journal of Network and Systems Management, Special Issue on Security Configuration, AFRL, Mar. 2008, (26 pages).
Qian, Haiyang, & Medhi, Deep, "Server Operational Cost Optimization for Cloud Computing Service Providers over a Time Horizon", HotICE 2011, Boston, Massachusetts, Mar. 29, 2011, (6 pages).
Sahai et al., "Automated Policy-Based Resource Construction in Utility Computing Environments", In R. Boutaba and S.-B. Kim, editors, Proceedings of the 9th IEEE/IFIP Network Operations and Management Symposium, (NOMS'2004), pp. 381-393, Seoul, Korea, Apr. 2004. IEEE Publishing, (13 pages).
Van Der Merwe et al., "Towards a Ubiquitous Cloud Computing Infrastructure", Apr. 2010, (6 pages).
Wood et al., "Black-box and Gray-box Strategies for Virtual Machine Migration", Mar. 16, 2007, (14 pages).
Yin et al., "Rhizoma: A Runtime for Self-Deploying Self-Managing Overlays", Nov. 30, 2009, (20 pages).
Zhang et al., "Optimizing Cost and Performance in Online Service Provider Networks", NSDI'10, Apr. 28, 2010, (15 pages).
Wieder et al., "Conductor: Orchestrating the Clouds", LADIS'10, Zurich, Switzerland, Jul. 28, 2010, (5 pages).
Wood et al., "The Case for Enterprise-Ready Virtual Private Clouds", 2009, (5 pages).
"Generic Constraint Development Environment", http://www.gecode.org/., Oct. 25, 2006, (2 pages).
"RapidNet", http://netdb.cis.upenn.edu/rapidnet/., Dec. 10, 2009, (2 pages).
"XSB Project", http://xsb.sourceforge.net/., Jan. 6, 2000, (2 pages).
Liu et al., "Towards Transactional Cloud Resource Orchestration", NSDI'11, Mar. 30, 2011 (1 page).
White et al., "Autonomic Computing: Architectural Approach and Prototype", Integrated Computer-Aided Engineering, Apr. 2006, (16 pages).

\* cited by examiner

SYSTEMS, METHODS, AND ARTICLES OF MANUFACTURE TO PROVIDE CLOUD RESOURCE ORCHESTRATION

FIELD OF THE DISCLOSURE

This disclosure relates generally to cloud computing and, more particularly, to methods, apparatus, and articles of manufacture to provide cloud resource orchestration.

BACKGROUND

In recent times, cloud computing services have been developed and deployed that allow customers to utilize computing resources without making capital expenditures to acquire such computing resources. Typically, a cloud computing service provider configures one or more computers and/or computer systems having at least one processor, storage and network access for the one or more computers and/or computer systems. These cloud computer systems allow a number of customers access to services provided by the computer systems. Services may include, for example, numerical processing, commercial transaction processing, storage, and/or web hosting.

In some cases, the cloud computing service provider configures the computer systems with one or more virtual machines (VMs) to service the customers' computing needs. VMs are virtual instances of an operating system that execute on underlying hardware resources. A VM user is provided with computing services that are logically separated from other instantiated VMs operating on the underlying hardware resources managed by the cloud computing service provider.

DETAILED DESCRIPTION

Figure 1:
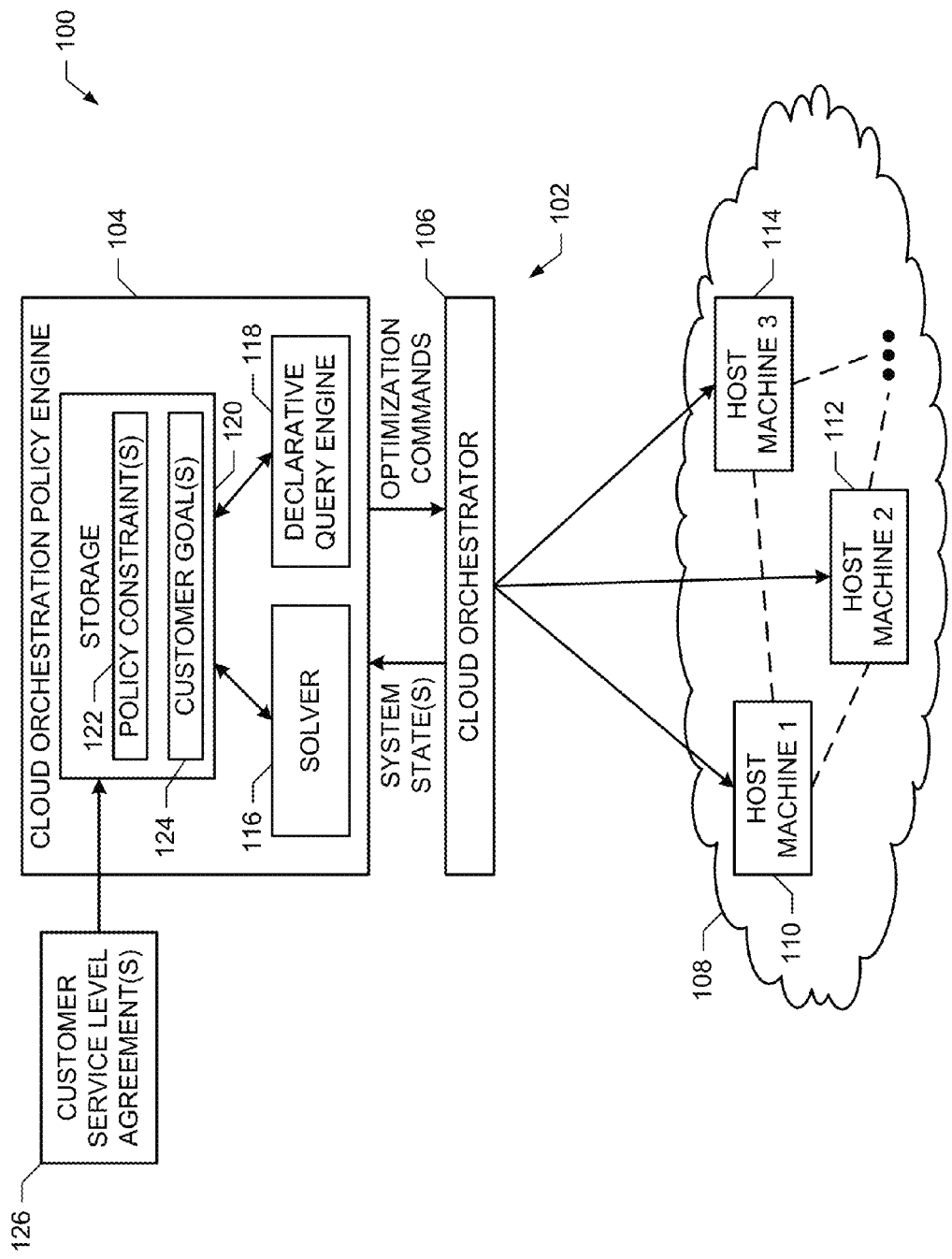
FIG. 1 is a block diagram of an example network including a cloud orchestration system constructed in accordance with the teachings of this disclosure.

Cloud resource orchestration involves the creation, management, manipulation and/or decommissioning of cloud resources, (e.g., computing, storage, and/or networking resources), in order to realize customer computing requests (e.g., processing requests, hosting requests, etc.), while conforming to operational objectives of cloud service providers. Cloud orchestration can be highly complex. For example, cloud management may be complicated due to scale, heterogeneity, infrastructure, and/or concurrency of user services that share the same set of physical resources. Additionally, different configurations of resources have different effects on the resources, performance of the resources, and/or the relative costs of the resources. For example, the locations of virtual machines (VMs) (e.g., geographic locations of host physical machines on which the VMs are operating) have an impact on storage placement, which in turn affect bandwidth utilization within and external to a data center. Third, cloud resources should be deployed in a manner that both achieves cloud service provider operational objectives and meets terms of customer service-level agreements (SLAs) as runtime conditions change.

One of the challenges resulting from cloud computing becoming widely deployed is the difficulty in orchestrating a highly complex set of subsystems (e.g., computing, storage, and/or networking resources) that span large geographic areas while serving diverse clients. Example systems, methods, and/or articles of manufacture disclosed herein provide a distributed platform that allows cloud providers to perform declarative automated cloud resource orchestration. In some examples, cloud service providers specify system-wide constraints and goals using a declarative policy language with an emphasis on specifying distributed constraint optimizations. An example of such a language is referred to herein as COPElog. Example systems, methods, and/or articles of manufacture using a declarative policy language receive policy specifications and/or cloud system states as input. Based on the input, some example systems, methods, and/or articles of manufacture calculate computational resource, storage, and/or networking resource allocations within the cloud and/or among the cloud providers such that cloud provider operational objectives and customer SLAs can be better met. Some example systems, methods, and/or articles of manufacture disclosed herein are implemented in integration with a cloud orchestration platform.

In known deployments, cloud service providers typically perform load balancing in an ad-hoc fashion. In such known systems, VM migrations are triggered by the presence of an overloaded host machine. VMs from the overloaded host machine are migrated to a machine having a relatively light load. While such ad-hoc approaches may work for a specific scenario, these approaches are unlikely to result in configurations that can be easily customized upon changing policy constraints and goals, and whose optimality cannot be easily quantified.

In contrast to known systems, example systems, methods, and/or articles of manufacture disclosed herein achieve cost reduction and improve cloud computing infrastructure utilization by automatically orchestrating the cloud resources based on policies configured by cloud providers. Some example systems, methods, and/or articles of manufacture disclosed herein are implemented using distributed optimizations. Some such example systems, methods, and/or articles of manufacture use a language referred to herein as COPElog, which supports distribution and/or integration of a distributed query engine with a constraint solver.

Example systems, methods, and/or articles of manufacture disclosed herein allow cloud providers to formally model cloud resources and formulate orchestration decisions as a constraint optimization problem (COP) using goals and/or cloud constraints. In some such examples, a distributed network of controllers, each of which presides over a cloud orchestration platform, coordinate resources across multiple data centers. Each node uses a constraint solver to generate a set of orchestration commands, and a distributed query engine for communicating policy decisions between different nodes. As used herein, a constraint optimization problem refers to a problem which can be characterized mathematically and in which one or more goal values are determined subject to one or more constraints on the values.

Some example systems, methods, and/or articles of manufacture mathematically model cloud resource orchestration as COPs. Some such example systems, methods, and/or articles of manufacture specify operational objectives and customer SLAs in terms of one or more goal(s), which are subject to a number of constraints specific to a particular cloud deployment scenario. In some examples, a solver automatically synthesizes orchestration commands based on the goal(s) and constraints.

By using distributed execution, example systems, methods, and/or articles of manufacture enable different cloud resource providers to configure smaller sets of resources while coordinating to achieve an overall objective. In some such examples, a distributed query engine includes constraint solving capabilities to coordinate the distributed optimizations.

FIG. 1 is a block diagram of an example network 100 including a cloud orchestration system 102 constructed in accordance with the teachings of this disclosure. The example cloud orchestration system 102 of FIG. 1 includes a cloud orchestration policy engine (COPE) node 104 and a cloud orchestrator 106. The example network 100 of FIG. 1 includes a wide area network 108 (e.g., a cloud, a cloud network) including a number of interconnected physical computing resources (e.g., servers) 110, 112, 114. The example cloud orchestration system 102 illustrated in FIG. 1 is configured in a centralized deployment, where cloud orchestration for the example network 100 is determined and/or configured by the central COPE node 104.

The example COPE node 104 of FIG. 1 includes a solver 116, a declarative query engine 118, and a storage 120. The example storage 120 stores one or more policy constraints 122 and one or more customer goals 124. An example goal 124 may include reducing (e.g., minimizing) a migration cost of VMs between data centers. In some examples, the policy constraints 122 include and/or are derived from customer SLAs 126. An example SLA 126 specifies a lower limit on service quality to be provided to the customer by the cloud deployment. A corresponding constraint 122 to the SLA 126 may specify that an average CPU load for VMs serving the customer must stay below a threshold load.

The example COPE node 104 of FIG. 1 receives states of the customer cloud deployment (e.g., node CPU load, memory usage, network traffic statistics) gathered from the cloud 108 via the cloud orchestrator 106. The COPE node 104 also receives one or more provider policy constraints and/or one or more goals, which are stored in the storage 120. In some examples, the provider policy constraint(s) 122 and/or the goal(s) 124 are specified in a declarative policy language. An example declarative policy language used by the cloud orchestration system 102 is COPElog, which is described in more detail in the examples provided below.

The example solver 116 of FIG. 1 automatically generates improvement commands based on the policy constraints 122 and the customer goals 124. The improvement commands may include affirmative actions and/or conditional rules that cause the servers 110-114 to modify a customer's cloud deployment to provide improved or otherwise modified services. The example cloud orchestrator 106 receives the improvement commands and generates orchestration operations to directly manipulate cloud resources (e.g., processing resources, storage, and/or networking resources) between the data centers 110-114. An example orchestration layer affected by the orchestration operations is the Data-centric Management Framework (DMF), which is described by Liu, et al. in "Cloud Resource Orchestration: A Data-Centric Approach," published in the $5^{th}$ Biennial Conference on Innovative Data Systems Research (CIDR '11), Jan. 9-12, 2011, Asilomar, Calif., USA, the entirety of which is hereby incorporated by reference. DMF provides high-level orchestration commands that relieve human operators from having to generate or modify ad-hoc configuration scripts. DMF further provides transactional semantics for orchestration commands, where the transactions are atomic, consistent, isolated, and durable (e.g., ACID) for a series of orchestration commands grouped as a transaction.

In an example cloud service called SimpleCloud operating on the example data center 108 of FIG. 1, a customer receives cloud services provided by the data center 108 in which the host physical machine(s) 110-114 are included. For example, the host machines 110-114 may be logically arranged as a cluster of servers and/or as multiple clusters of servers. SimpleCloud is realized within one or more of the physical machine(s) 110-114 and is used to host a variety of client applications. In the example SimpleCloud, the customer may spawn new virtual machines (VMs) on the physical machine(s) 110-114 from an existing disk image, start VMs, shut down VMs, and/or delete VMs at later time(s). Because the example cloud service SimpleCloud of FIG. 1 is located within the data center 108 operated by a single cloud provider, the example cloud orchestration system 102 is deployed as a centralized COPE node 104 for the data center 108. The COPE node 104 provides a cloud resource orchestration solution to the cloud orchestrator 106, which generates instructions based on the solution. An example solution and/or implementing instructions may manipulate the placement and/or spawning of VMs within the physical machine(s) 110-114.

During an example operation of SimpleCloud, the example COPE node 104 receives real-time system states (e.g., CPU load, memory load, migration feasibility) from the example cloud orchestrator 106. The example COPE node 104 also receives a set of policies specified by the cloud provider. An example production (e.g., optimization) goal 124 in the operation of SimpleCloud in FIG. 1 is to reduce a CPU load variance across the machines in the cloud 106 (e.g., to avoid hot-spots, a condition in which one or more of the physical machines 110-114 is operating at relatively high workloads while others of the physical machines 110-114 are operating at relatively low workloads). In some examples, constraints are tied to each physical machine's 110-114 resource availability (e.g., each machine 110-114 can only run up to a corresponding fixed number of VMs, run certain classes of VMs, and/or cannot exceed memory limits) and/or security concerns (e.g., VMs can only be migrated across certain types of machines). In some examples, a policy constraint is to reduce (e.g., minimize) a total number of VM migrations between the physical machine(s) 110-114 provided the load variance goal is met across the machines 110-114.

Another example production goal is to reduce (e.g., minimize) a number of physical machines 110-114 that are hosting VMs (e.g., to consolidate workloads), provided each example client application receives sufficient resources to meet customer performance demands specified in the SLA 126. Given a set of production goals 124 and constraints 122, the example COPE node 104 may execute periodically, aperiodically, on request, conditionally in response to an imbalance and/or other condition, and/or when the CPU and memory usages of the physical machine(s) 110-114 are changed.

The example declarative query engine 118 of FIG. 1 generates a COP from the set of constraint(s) 122 and goal(s) 124. The example solver 116 attempts to find an assignment of values (e.g., variables used to define the constraints and goals, where the possible values are within a domain) to a set of variables in order to satisfy the constraints 122 under a production goal 124. In the example of FIG. 1, goals 124 are expressed as a minimization over a cost function of the assignments of values to variables.

In the example of FIG. 1, the declarative query engine 118 uses a declarative policy language, such as COPElog, to specify the COP. Additional derivation rules are used to process intermediate system states for use by the example solver 116 in processing or solving the COP. COPElog is based on Datalog, which is a recursive query language sometimes used for querying graphs. Datalog is relatively concise when used to specify dependencies among system states, such as distributed system states that exhibit recursive properties. In contrast to Datalog, the COPElog language is rooted in logic to provide a mechanism for the example declarative query engine 118 to express goals and constraints of a COP for use by the example solver 116. Thus, the example COPElog language extends Datalog by using constructs for expressing goals, constraints, and distributed computations.

In COPElog, regular Datalog-type rules are used to generate intermediate tables used by the solver 116. Thus, COPElog uses rules having the form r:—$q_1, q_2, \ldots, q_n$ which, when executed, results in the derivation that r is true whenever the rule body ($q_1$ and $q_2$ and ... and $q_n$) is true. In accordance with standard Datalog terminology, each term within a rule (e.g. $q_1$, $q_2$) is referred to herein as a predicate. Derivations obtained (e.g., r) during rule body execution are referred to herein as tuples. Attributes in upper case (e.g., Mem in line 6 of Program 1) refer to variables, while attributes in lower case (e.g., mem_thres in line 6 of Program 1) refer to constants. Constraint rules having the form $F_1 \rightarrow F_2$, $F_3, \ldots, F_n$, denote the logical meaning that whenever $F_1$ is true, then the rule body ($F_2$ and $F_3$ and ... and $F_n$) must also be true to satisfy the constraint. Unlike a Datalog rule, which derives new values for a predicate, a constraint restricts a predicate's allowed values, hence representing an invariant that must be maintained at all times. During execution, the example solver 116 of FIG. 1 uses the constraints (e.g., c1, c2, c3, etc.) to limit the search space when computing the production goal.

An example centralized COP Program 1 is illustrated below and is expressed using COPElog. The example declarative policy engine 118 of FIG. 1 may generate the program illustrated below using corresponding policy goals and constraints. The example declarative policy engine 118 reserves the keywords goal and var to specify goals and variables, respectively, used by the solver 116. An explanation of the following statements in the example Program 1 is provided below.

```
// Program 1
1: goal minimize C in stdevCPU(C).
2: var hostAssign(Hid,Vid) forall vm(Vid,CPU,Mem).
3: r1 aggCPU(Hid,SUM<CPU>) :- hostAssign(Hid,Vid),
   vm(Vid,CPU,Mem).
4: r2 stdevCPU(STDEV<CPU>) :- aggCPU(Hid,CPU).
5: r3 aggMem(Hid,SUM<Mem>) :- hostAssign(Hid,Vid),
   vm(Vid,CPU,Mem).
6: c1 aggMem(Hid,Mem) -> Mem<=mem_thres.
7: c2 hostAssign(Hid,Vid) -> vm(Vid,CPU,Mem), CPU>load_thres.
8: c3 hostAssign(Hid,Vid) -> host(Hid).
// end of Program 1
```

The example tuples stdevCPU(C), hostAssign(Hid,Vid), vm(Vid,CPU,Mem), aggCPU(Hid,SUM<CPU>), stdevCPU (STDEV<CPU>), aggMem(Hid,SUM<Mem>), and host (Hid) are represented as tables in the example storage 120 of FIG. 1. In line 1 of the example Program 1, the declarative policy engine 118 defines a goal of the COP which, in this example, is to minimize CPU standard deviation, which is expressed as the attribute C in stdevCPU. In line 2, the example declarative policy engine 118 specifies that the solver 116 is to output entries in hostAssign(Hid,Vid), where each entry in hostAssign indicates that a VM identified by the variable Vid is assigned to a host physical machine identified by the variable Hid. The declarative policy engine 118 further specifies that Vid of the illustrated example is bounded, via the forall expression, to the existing VMs stored in vm(Vid, CPU,Mem).

The above-described Program 1 uses tables vm(Vid,CPU, Mem) and host(Hid) as input. Each entry in vm(Vid,CPU, Mem) stores information associated with a virtual machine (VM), where the identifier Vid uniquely identifies the respective VM. Each entry in vm(Vid,CPU,Mem) also provides additional information about the VM (e.g., the CPU utilization of the VM(CPU), the memory usage of the VM(Mem)) that is monitored (e.g., by the cloud orchestrator 106). The monitored information can additionally or alternatively be provided by cloud infrastructure, which regularly updates CPU and memory utilization attributes in the vm(Vid,CPU, Mem) table. The host(Hid) table stores the set of currently available machines that can run VMs. Given the input tables vm(Vid,CPU,Mem) and host(Hid), the example Program 1 expresses derivation rules and constraints.

An example derivation rule r1 aggregates the CPU of all VMs running on each host Hid in the host(Hid) table. Similarly, the example derivation rule r3 aggregates the Mem of all VMs running on each host Hid in the host(Hid) table. The example derivation rule r2 uses the output from r1 to compute a system-wide standard deviation (StdDev) of the aggregate CPU load across all hosts. The example solver 116 uses the output from the rule r2 to explore the search space that meets the production goal.

An example constraint c1 in Program 1 expresses that no host Hid can accommodate VMs whose aggregate memory exceeds its physical limit (e.g., a predefined threshold mem_thres). Similarly, constraint c2 restricts migration to VMs whose CPU load is above a load threshold (e.g., a predefined threshold load_thres). The example constraint c2 is used to reduce unnecessary migrations (e.g., migrating VMs having a light CPU load) by removing the VMs with light load from the list. An example constraint c3 only allows VMs to be assigned to hosts that are currently available.

The example declarative query engine 118 may execute Program 1 a single time, periodically, aperiodically, and/or in a substantially continuous fashion. When executing substantially continuously, the example declarative query engine 118 executes the program as a continuous query, and then triggers the solver 116 when a rule body predicate is updated (e.g. reported changes to monitored CPU and/or memory usage for a given VM, instantiation and/or suspension of VMs). The output of the example solver 116 for the Program 1 is a table hostAssign(Hid,Vid). For each entry in the hostAssign(Hid, Vid) table, the example COPE node 104 invokes a migration operation. In some examples, the migration operations are not invoked and/or are considered a nullity if VM Vid currently resides in Hid.

The example COPE node 104 of FIG. 1 may generate a different policy based on a change in goal(s), constraint(s), and/or derivation rule(s) of a program. Accordingly, a user may design different programs using COPElog to customize different policies. For instance, if an overhead cost of migrating VMs between servers is prohibitively high, a user may program a goal that reduces (e.g., minimizes) the number of VM migrations. In some examples, a rule triggers the solver 116 to solve the COP in Program 1 whenever load imbalance is observed (e.g., C in stdevCPU exceeds a threshold). In another example, the number of unique hosts used for migration can be optimized (e.g., reduced, minimized) while meeting customer SLAs when consolidating workloads.

The example declarative query engine 118 of FIG. 1 is implemented using the RapidNet distributed query engine, available at <http://netdb.cis.upenn.edu/rapidnet/>. In some such examples, the solver 116 is implemented using the Gecode constraint solver, available at <www.gecode.org>. To perform cloud resource orchestration, a COPElog program (e.g., Program 1) is compiled into executable code using the declarative query engine 118 (e.g., via RapidNet). The declarative query engine 118 generates and stores the policy constraint(s) 122 and goal(s) 124 into the storage 120. The example COPE node 104 then invokes the solver 116 (e.g., Gecode) to perform constraint solving. In some examples, the declarative query engine 118 maps goal, var, and/or constraints from COPElog into equivalent COP primitives in Gecode.

Gecode adopts a branch-and-bound searching approach to solve the problem (e.g., optimization) while exploring the space of variables under constraints (e.g. c1-c3). In addition to these constraints, rules that use solver results as input (e.g. r1 and r3 of Program 1) are rewritten into constraints to further restrict the search space.

The integration of RapidNet (an incremental bottom-up distributed Datalog evaluation engine) and Gecode (a top-down goal-oriented constraint solver) in the example COPE node 104 enables implementation of a distributed solver that can perform incremental and/or distributed constraint optimizations.

Figure 2:
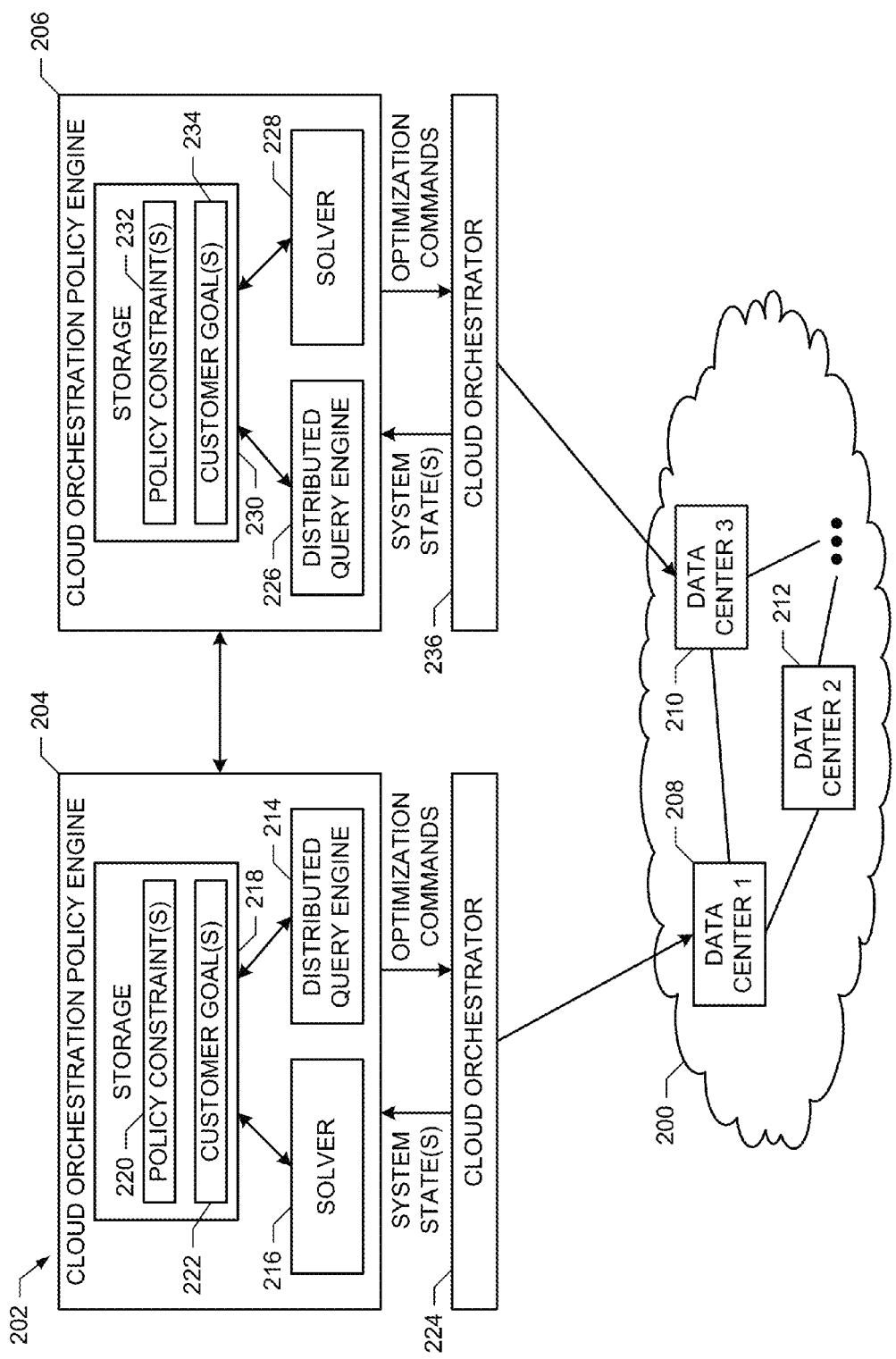
FIG. 2 is a block diagram of an example network including a distributed cloud orchestration system constructed in accordance with the teachings of this disclosure.

FIG. 2 is a block diagram of an example network 200 including a distributed cloud orchestration system 202 constructed in accordance with the teachings of this disclosure. The example distributed cloud orchestration system 202 of FIG. 2 includes multiple COPE nodes 204, 206. The example COPE nodes 204, 206 are communicatively coupled to the network 200, which includes data centers 208, 210, 212. In some examples, a COPE node 204, 206 is provided for each of the data centers 208, 210, 212. In the example network of FIG. 2, the data centers 208, 210, 212 are administered by different cloud providers. Each cloud provider runs an independent COPE node 204, 206 to manage an internal configuration for the data center 208, 210, 212. However, the COPE nodes 204, 206 coordinate with other COPE nodes 204, 206 to configure inter-data center cloud resource deployments (e.g., VM assignments to hosts in different data centers operated by independent cloud providers). In some examples, the network 200 and/or the data centers 208, 210, 212 are under a single administrative domain, and the cloud provider may choose to configure a subset of resources for a customer using local deployment commands. In the example of FIG. 2, the data centers 208, 210, 212 are geographically distributed (e.g., in different cities, states, countries, continents, etc.). For brevity, a COPE node for the data center 212 is not shown. The descriptions of the example COPE nodes 204, 206 may be applied to a COPE node corresponding to the data center 212.

The example COPE node 204 of FIG. 2 configures a first one of the data centers 208, and includes a distributed query engine 214, a solver 216, and storage 218. The example storage 218 of FIG. 2 stores, among other things, policy constraint(s) 220 and customer goal(s) 222 generated and/or used by the distributed query engine 214 and/or the solver 216. The example COPE node 204 generates orchestration rules and/or commands that are implemented via a cloud orchestrator 224. The example COPE node 206 configures a second one of the data centers 210, and includes a distributed query engine 226, a solver 228, and storage 230. The example storage 230 of FIG. 2 stores, among other things, policy constraint(s) 232 and customer goal(s) 234 generated and/or used by the distributed query engine 226 and/or the solver 228. The example COPE node 206 generates orchestration rules and/or commands that are implemented via a cloud orchestrator 236. In combination, the example COPE nodes 204, 206 coordinate the exchange of system states and output (s) between the COPE nodes 204, 206 to achieve, via the data centers 208, 210, 212, a customer goal having one or more constraints.

An advantageous example use of the distributed cloud orchestration system 202 of FIG. 2 is a Follow-the-Sun scenario, which migrates VMs across geographically-distributed data centers 208, 210, 212 based on changing customer needs. In the example Follow-the-Sun scenario, the geographic location of the primary workload (e.g., the majority of customers using the cloud service) shifts hosting demands during the course of a day, and it is advantageous for the customers to be in close proximity to the resources on which the workload is operating. To maintain a desirable customer experience, the example distributed cloud orchestration system 202 of FIG. 2 determines and executes VM migration decisions in real-time on the live cloud deployment (e.g., on the data centers 208, 210, 212 that are serving customer requests) with little or no disruption to services.

In the example of FIG. 2, the distributed cloud orchestration system 202 enables service consolidation (e.g., to reduce operating costs for providers) and improves application performance (e.g., to the improve cloud computing experience for customers), while ensuring that customer SLAs of web services (e.g. average end-to-end latency of user requests) are met. In some examples, the distributed cloud orchestration system 202 reduces inter-data center communication overhead. Since the example data centers 208, 210, 212 of FIG. 2 are operated by different cloud providers, the Follow-the-Sun operational example described below uses a distributed deployment, where each COPE node 204, 206 is responsible for controlling resources within its respective data center 208, 210.

In an example COP-based mathematical model of the Follow-the-Sun scenario, there are n autonomous geographically distributed data centers (e.g., data centers 208, 210, 212) $C_1$; $C_2$; ... ; $C_n$ at locations 1; 2; ... ; n. Each example data center 208, 210, 212 is managed by a COPE node 204, 206. Additionally, each data center 208, 210, 212 (e.g., designated $C_i$, where i=1→n) has a resource capacity (e.g., the maximum number of VMs that can be hosted by the data center) denoted as $R_i$ (e.g., i=1→n). Each customer specifies a number of VMs to be instantiated, as well as a preferred geographic location. We denote the aggregated resource demand at location j as $D_j$, which is the number of VMs demanded by all customers at that location. Given the resource capacity $R_i$ and demand $D_j$ for a data center (e.g., the data center 208), the example COPE node 204 $C_i$ allocates an amount $A_{ji}$ of resources (e.g., a number of VMs) to meet customer demand $D_j$ at location j.

Continuing with the example, $M_{ijk}$ denotes the number of VMs to be migrated from a first data center $C_i$ (e.g., data center 208) to another data center $C_j$ (e.g., data center 210) to meet the customer demand Dk. When the number of VMs $M_{ijk}$ is greater than 0, the example COPE node 204 will issue commands to migrate the appropriate number and/or types of VMs from the data center 208 to the data center 210. The example COPE node 204 of FIG. 2 may periodically and/or aperiodically determine a number of VMs to be migrated to meet customer demand, and/or may determine a number of VMs on demand whenever system parameters (e.g., demand D and/or resource capacity R) changes substantially.

In the illustrated example, a known, naive algorithm migrates VMs to customers' preferred locations. However, such a migration could be infeasible (e.g., when the aggregated resource demand D exceeds resource capacity R) and/or disadvantageous (e.g., when the operating cost of a designated data center i is substantially more expensive than neighboring data centers, when customer traffic patterns incur high communication cost, when a substantial number of customers accessing the VMs are geographically far away from the customer's preferred data center, etc.).

In contrast to known approaches, the example distributed cloud orchestration system 202 of the example of FIG. 2 uses a COP approach to adjust (e.g., optimize) a VM deployment configuration based on one or more of a number of factors (e.g., a cost function). The example distributed cloud orchestration system 202 of FIG. 2 considers three example types of costs: 1) an operating cost of a data center $C_j$ (e.g., typical recurring costs of operating a data center) is defined as $OC_j$; 2) a communication cost of meeting resource demand $D_i$ from data center $C_j$ is defined as $CC_{ij}$; and 3) a migration cost (e.g., a communication overhead cost of moving a VM from $C_i$ to $C_j$) is defined as $MC_{ij}$. Using these three example costs, an example COP Problem to be solved by the distributed cloud orchestration system 202 (e.g., via the COPE nodes 204, 206) is:

COP Problem

1: $\min(aggOC + aggCC + aggMC)$

2: $aggOC = \sum_{j=1}^{n}\left(\sum_{i=1}^{n}\left(A_{ij} + \sum_{k=1}^{n}M_{kji}\right) * OC_j\right)$ 3: $aggCC = \sum_{j=1}^{n}\sum_{i=1}^{n}\left(\left(A_{ij} + \sum_{k=1}^{n}M_{kji}\right) * CC_{ij}\right)$ 4: $aggMC = \sum_{i=1}^{n}\sum_{j=1}^{n}\left(\left(\sum_{k=1}^{n}\max(M_{ijk}, 0)\right) * MC_{ij}\right)$ subject to:

5: $\forall j : R_j \geq \sum_{i=1}^{n}\left(A_{ij} + \sum_{k=1}^{n}M_{kji}\right)$ 6: $\forall i, j, k : M_{ijk} + M_{jik} = 0$ The example COP Problem attempts to reduce (e.g., minimize) the aggregate cost for the cloud providers (e.g., the total costs of operating the data centers 208, 210, 212). In the COP Problem, the aggregate cost is defined as the sum of: the aggregate operating cost (e.g., aggOC) across the data centers 208, 210, 212; the aggregate communication cost (e.g., aggCC) to meet customer demands served by the data centers 208, 210, 212; and the aggregate VM migration cost (e.g., aggMC). The aggregate operating cost, the aggregate communication cost, and the aggregate migration cost of the COP Problem are computed by summing up the operating costs $OC_j$, the communication costs $CC_{ij}$, and the migration costs $MC_{ij}$ for the entire system.

The above example COP Problem is subjected to two constraints. In the first constraint (line 5), each example data center 208, 210, 212 may not allocate more resources than that data center 208, 210, 212 possesses. The second example constraint (line 6) ensures a zero-sum relation between migrated resources between Ci and Cj for a demand k. For example, if one of the data centers (e.g., the data center 208) migrates a number M of VMs to a second one of the data centers (e.g., the data center 210), the other of the data centers must migrate the same number M of VMs from the first one of the data centers.

As mentioned above, the example system 202 of FIG. 2 may be used to provide a distributed implementation. The example COPE nodes 204, 206 of FIG. 2 use an iterative distributed graph-based computation strategy, in which the example nodes 204, 206 execute a local COP and then iteratively exchange COP results with neighboring COPE nodes 204, 206 until a condition is reached (e.g., a stop condition). In some such examples, the data centers 208, 210 are represented as nodes in a graph, where a link exists between two nodes if resources (e.g., VMs) can be migrated between them. The following COPElog Program 2 implements the local COP at a given node X (e.g., the data center 208). A mapping from the example COP Problem to the Program 2 is shown in Table 1 below.

```
// Program 2 - Distributed COPElog Program
1: goal minimize C in totalCost(@X,C).
2: var migVM(@X,Y,D,R) forall eSetLink(@X,Y,D).
3: r1 totalCost(@X,SUM<C>) :- link(@X,Y), aggCost(@Y,C).
4: r2 aggCost(@X,C) :- aggOpCost(@X,C1), aggCommCost(@X,C2),
aggMigCost(@X,C3), C=C1+C2+C3.
5: r3 aggOpCost(@X,SUM<Cost>) :- curVM(@X,D,R1),
migVM(@X,Y,D,R2), opCost(@X,C), Cost=C*(R1-R2).
6: r4 aggCommCost(@X,SUM<Cost>) :- curVM(@X,D,R1),
migVM(@X,Y,D,R2), commCost(@X,Y,C), Cost=C*(R1-R2).
7: r5 aggMigCost(@X,SUM<Cost>) :- migVM(@X,Y,D,R),
migCost(@X,Y,C), Cost=R*C, Cost>0.
8: r6 aggCurVM(@X,SUM<R>) :- curVM(@X,D,R)
9: r7 aggMigVM(@X,SUM<R>) :- migVM(@X,Y,D,R)
10: c1 aggMigVM(@X,R2) -> resource(@X,R), aggCurVM(@X,R1),
R1-R2>=R
11: r8 migVM(@Y,X,D,R2):- migVM(@X,Y,D,R1), R2=-R1
// end of Program 2
```

TABLE 1

Mappings from COP Problem to COPElog Program 2.

| COP | COPElog |
|---|---|
| symbol $R_i$ | resource(I, R) |
| symbol $A_{ij}$ | curVM(I, J, R) |
| symbol $M_{ijk}$ | migVM(I, J, K, R) |
| equation(1) | rule goal, r1-2 |
| equation(2) | rule r3 |

TABLE 1-continued

Mappings from COP Problem to COPElog Program 2.

| COP | COPElog |
|---|---|
| equation(3) | rule r4 |
| equation(4) | rule r5 |
| equation(5) | rule r6-7, constraint c1 |
| equation(6) | rule r8 |

The above Program 2 is written using distributed variant of Datalog used in declarative networking, where the location specifier @ denotes the source location of each corresponding tuple. Using the specifier @, input data of rules may span multiple nodes (e.g., data centers 208-212), which is a convenient language construct for formulating distributed optimizations. Table 1 summarizes the mapping from COP symbols (e.g., $R_i$, $A_{ij}$, $M_{ijk}$) to COPElog tables (e.g., resource(I, R), curVM(I,J,R), and migVM(I,J,K,R), and from COP equations (e.g., equations (1)-(6)) to COPElog rules/constraints (e.g., rules r1-r8, constraint c1) identified by the rule labels. In the example mappings of Table 1, $R_i$ is stored as a resource(I,R) tuple. Similarly, the R attribute in mig(I,J,K,R) stores the value of $M_{ijk}$.

Operation of the example localized COPElog Program 2 is described with reference to the system 202 of FIG. 2. The example production goal of Program 2 is to reduce (e.g., minimize) the total cost within a local region (node X) (e.g., data center 208) and its neighbors (e.g., data centers 210, 212). Periodically, an eSetLink event triggers the local COP operation at the data center 208. On commencement of the local COP operation, the COPE node 204 associated with the data center 208 pseudorandomly selects one of the links between the data center 208 and a neighboring data center 210, 212 with which to start a link negotiation process with the corresponding neighbor (e.g., the data center 210) for resource demand at D. The eSetLink(@X,Y,D) tuple is generated periodically at node X via a COPElog rule, in which Y and D denote the data center 210 that was pseudorandomly chosen for the negotiation process and the resource demand location, respectively. To avoid conflicts, for any given link (X,Y) between two data centers 208, 210, the example link negotiation protocol of the illustrated example selects the node with the larger identifier ((e.g., serial number, Internet protocol address, Media Access Control address, etc.) to carry out the negotiation process (e.g., a master-slave relationship). Any other selection mechanism may be used. For example, the node with the smaller identifier may be used.

During the negotiation process, each of the example data centers 208, 210 of the illustrated example exchanges a corresponding aggregate system state aggCost with its neighboring data centers 208-212. In the illustrated example, the aggregate system state aggCost for the data center 208 is derived by the example COPE node 204 using rules r2-r5. To determine the aggregated system state aggCost, the COPE node 204 of the illustrated example collects the aggCost tables of neighboring data centers 210, 212, and then performs a SUM aggregate, which is stored in totalCost in accordance with rule r1. The example process of the illustrated example solves the local COP by reducing (e.g., minimizing) totalCost to determine a quantity of resources to be migrated to (or from) the neighboring data center 210. The example COP Problem, represented by Program 2, is expressed by solving the production goal under the specified constraint c1 in combination with rules r6 and r7. The example COPE node 204 propagates the resulting migration migVM to immediately neighboring COPE nodes (e.g., the COPE node 206).

The resulting migration is performed according to rule r8, which ensures symmetry by requiring the outgoing migration from one of the nodes to be equal to the incoming migration for the corresponding neighbor node. The example COPE node 204 of the illustrated example iterates processing of the local COPElog Program 2 until all links with neighboring data centers 210, 212 have been assigned values, and/or when a stopping condition is reached.

The example COPE nodes 204, 206 of FIG. 2 use RapidNet to implement the example distributed query engines 214, 226. To implement the distributed system 202, the example distributed rules and/or constraints are rewritten using a localization rewrite and respective distinct location specifiers. The transformation results in rule bodies (e.g., the predicate of a rule, to the right of the :—symbol) that can be executed locally on a COPE node 204, 206, and rule heads (e.g., the deduced value of the rule, to the left of the :—symbol) that can be derived and sent between the COPE nodes 204, 206 to facilitate distributed execution. Even if the original COP Problem expresses distributed properties and constraints, the process of rewriting to a localized COPE program results in multiple local COP operations at different nodes, and the outputs of COP operations via derivations are sent between COPE nodes. For example, rule r8 of Program 2 sends the output of a local COP execution (e.g., at a node X) to another node (e.g., a node Y) to continue on the process in another iteration.

Figure 3:
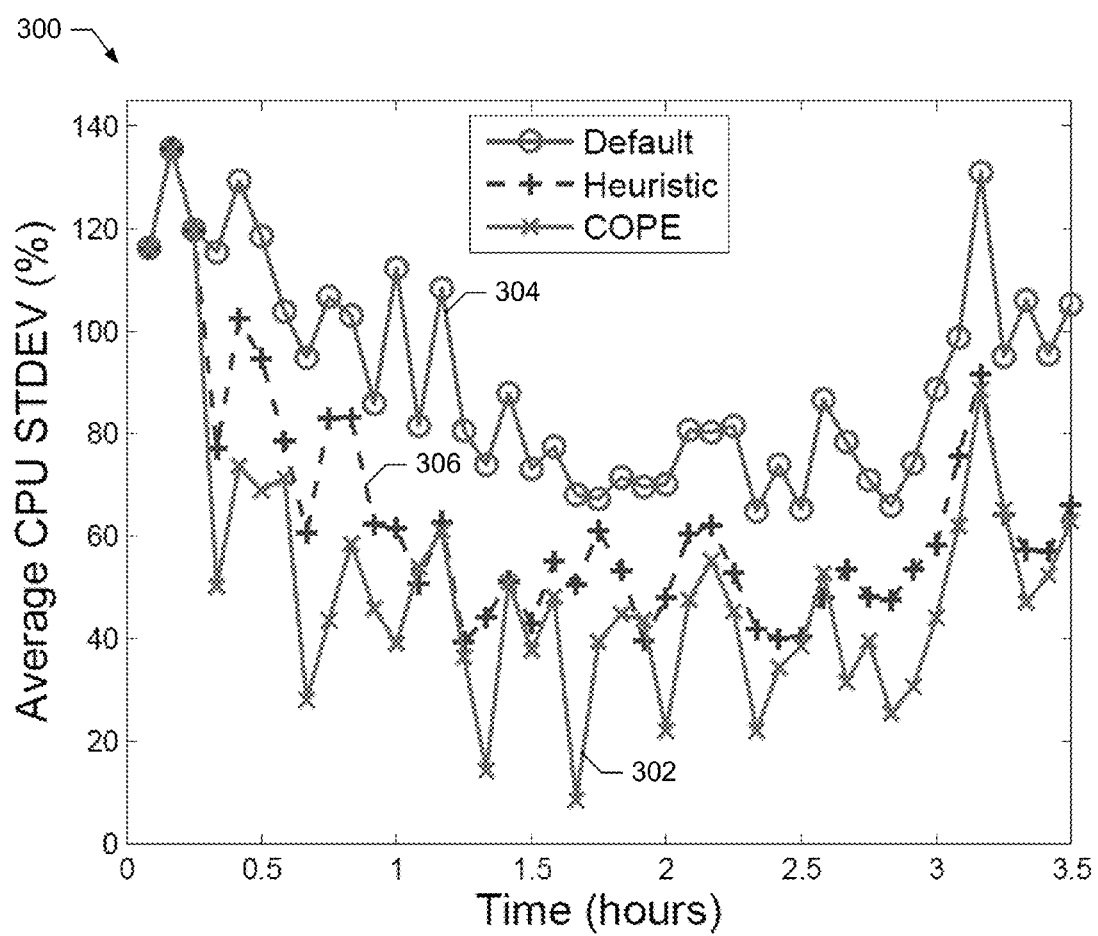
FIG. 3 is a graph illustrating results of an example cloud orchestration test performed in accordance with the teachings of this disclosure and results of known cloud orchestration techniques.

FIG. 3 is a graph 300 illustrating results of an example cloud orchestration test performed in accordance with the teachings of this disclosure and results of known cloud orchestration techniques. In particular, the results in the graph 300 are derived from a trace-driven experiment executing the COPElog program for the example SimpleCloud scenario described above with reference to FIG. 1 (e.g., centralized deployment). The example experiment used data center traces obtained from a large hosting company in the United States. A trace primarily includes sampling CPU and memory utilization at each physical processor (PP), where samples were gathered at certain (e.g., 300 second) intervals. The data of the illustrated example represents up to 248 customers hosted on a total of 1,740 statically allocated physical processors (PPs) (e.g., physical resources, physical machines). Each customer application is deployed on a subset of the PPs. The example traces were one month in duration.

Based on the trace of the illustrated example, a hypothetical workload was generated to be applied to a hypothetical cloud environment (e.g., similar to the SimpleCloud scenario). The example hypothetical cloud environment included 15 physical machines geographically dispersed across 3 data centers (e.g., 5 host physical machines in each data center). Each example physical machine had 32 GB of memory (e.g., RAM) and hosted local-only and/or migratable VMs. The example hypothetical workload preallocated 56 local VMs on each of 15 host physical machines, and 8 migratable VMs on each of 12 host physical machines. The 3 host physical machines not hosting migratable VMs served as storage servers for respective ones of the 3 example data centers. Thus, the example deployment scenario included about 936 VMs dispersed among the data centers and host physical machines.

The example hypothetical workload included spawning VMs, stopping VMs, and/or starting VMs. CPU demand (e.g., the percentage of a PP's CPU resources that are being used) was aggregated over all PPs belonging to a customer for each example time interval. The average CPU load was then calculated based on the aggregated CPU demand, under the assumption that the load is equally distributed among the allocated VMs for each host physical machine. VM spawning occurs when a customer's average CPU load per VM exceeds a high threshold and there are no free VMs available. In response, one additional VM is spawned on a random host physical machine by cloning a VM from an image template. Whenever a customer's average CPU load decreases below a lower threshold, a VM is powered off to save resources (e.g. energy, memory). In the example workload, stopped VMs are not reclaimed. The VMs may be restarted by powering them on when, for example, the CPU demands increase (e.g., the average CPU load increases above an upper threshold).

The example COPE deployment scenario periodically (e.g., every 20 minutes) executes the example COPElog Program 1 to perform a COP computation that orchestrates load balancing via VM migration within each of the example data centers (e.g., data centers 110, 112, 114). The Program 1 uses as input the vm(Vid,CPU,Mem) table, which is updated by the cloud orchestrator 106, as well as the host(Hid) table. FIG. 3 shows the resulting average CPU standard deviation of the three example data centers 110, 112, 114 achieved by the COPElog program over a 3.5 hour period. During the illustrated period, there was an average of 16.8 VM migrations every 20-minute interval.

To validate that COPE is achieving good load balancing, FIG. 3 shows the CPU load balancing results 302 of the example COPE node 104 against results 304, 306 of two known approaches, labeled Default 304 and Heuristic 306. The Default 304 is the most naive strategy, which does no migration after VMs are initially placed on a random host. The Heuristic 306 is a threshold-based policy that migrates VMs from the highest-loaded host physical machine (the physical machine with the highest aggregate CPU load of the VMs running on it) to the lowest-loaded host physical machine until the highest-to-lowest load ratio is below a threshold K. In the example results of FIG. 3, the threshold K is 1:2. The Heuristic 306 emulates an ad-hoc strategy that a cloud operator may adopt in the absence of the example COPE node 104. As illustrated in FIG. 3, the example COPE node 104 is able to more effectively perform CPU load balancing than known heuristic and/or default methods. In particular, the example results 302 from the COPE node 104 achieved a 44% reduction of the degree of CPU load imbalance compared to the Default results 304 and an 18% reduction compared to the Heuristic results 306.

The example results 302 of FIG. 3 illustrate the capability of the example COPE node 104 and COPElog in enforcing an example load balancing policy (e.g., CPU load balancing). The example COPE node 104 may be customized by changing the rules via the COPElog program to implement different policies to load-balance memory usage, reduce a number of VM migrations, and/or any other cloud orchestration goal or policy.

To obtain the results 302 of FIG. 3, the example COPE node 104 was implemented using an Intel Quad core 2.33 GHz PC with 4 GB RAM, running Ubuntu 10.04. The COPE node 104 (e.g., the solver 116) performed COP solving in an average of 0.6 seconds. The longest time taken by the solver 116 to solve a COP was 6.1 seconds. The RAM footprint for the solver 116 averaged about 217 KB and had a maximum footprint of about 409 KB. For larger-scale data centers with more migratable VMs, the solver 116 may take more time to solve the COPs. If the time increases exponentially for large numbers of VMs, the likelihood that the solver 116 will obtain an optimal solution in a given amount of time (e.g., less time than it would take to migrate VMs prior to the next iteration of COP solving) is reduced.

While example manners of implementing the COPE node 104 have been illustrated in FIGS. 1 and 2, one or more of the elements, processes and/or devices illustrated in FIGS. 1 and 2 may be combined, divided, re-arranged, omitted, eliminated and/or implemented in any other way. Further, the example solvers 116, 216, 228, the example declarative query engine 118, the example storage 120, 218, 230, the example distributed query engines 214, 226, and/or, more generally, the COPE nodes 104, 204, 206 and/or the example cloud orchestrators 106, 224, 236 of FIGS. 1 and 2 may be implemented by hardware, software, firmware and/or any combination of hardware, software and/or firmware. Thus, for example, any of the example solvers 116, 216, 228, the example declarative query engine 118, the example storage 120, 218, 230, the example distributed query engines 214, 226, and/or, more generally, the COPE nodes 104, 204, 206 and/or the example cloud orchestrators 106, 224, 236 of FIGS. 1 and 2 could be implemented by one or more circuit (s), programmable processor(s), application specific integrated circuit(s) (ASIC(s)), programmable logic device(s) (PLD(s)) and/or field programmable logic device(s) (FPLD (s)), etc. When any of the system or apparatus claims of this patent are read to cover a purely software and/or firmware implementation, at least one of the example solvers 116, 216, 228, the example declarative query engine 118, the example storage 120, 218, 230, and/or the example distributed query engines 214, 226 are hereby expressly defined to include a tangible computer readable medium such as a memory, DVD, CD, etc. storing the software and/or firmware. Further still, the example COPE nodes 104, 204, 206 of FIGS. 1 and 2 may include one or more elements, processes and/or devices in addition to, or instead of, those illustrated in FIGS. 1 and 2, and/or may include more than one of any or all of the illustrated elements, processes and devices.

Figure 4:
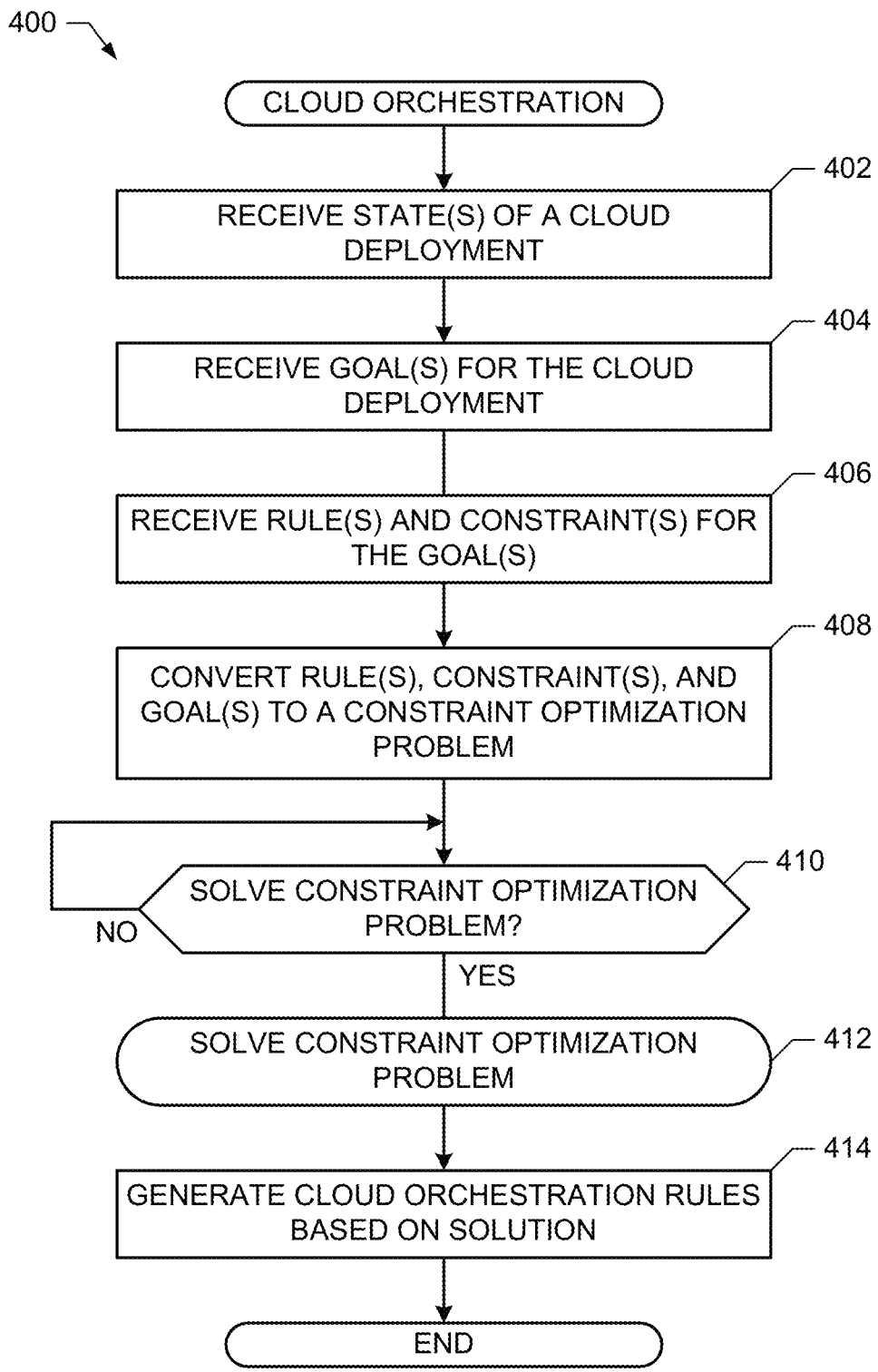
FIG. 4 is a flowchart representative of example machine readable instructions that may be executed to provide cloud resource orchestration.
Figure 5:
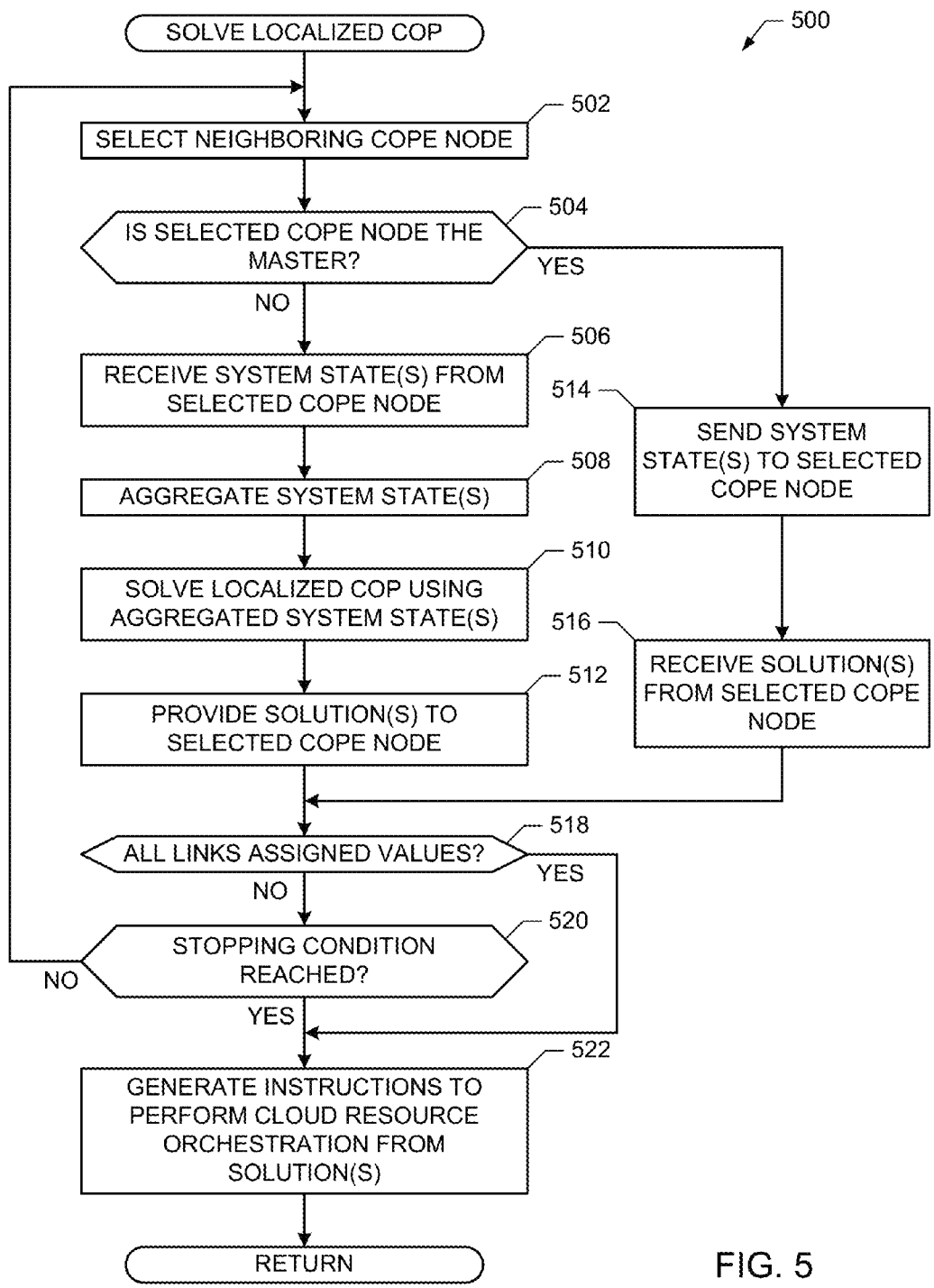
FIG. 5 is a flowchart representative of example machine readable instructions that may be executed to solve a localized constraint optimization problem for cloud resource orchestration.
Figure 6:
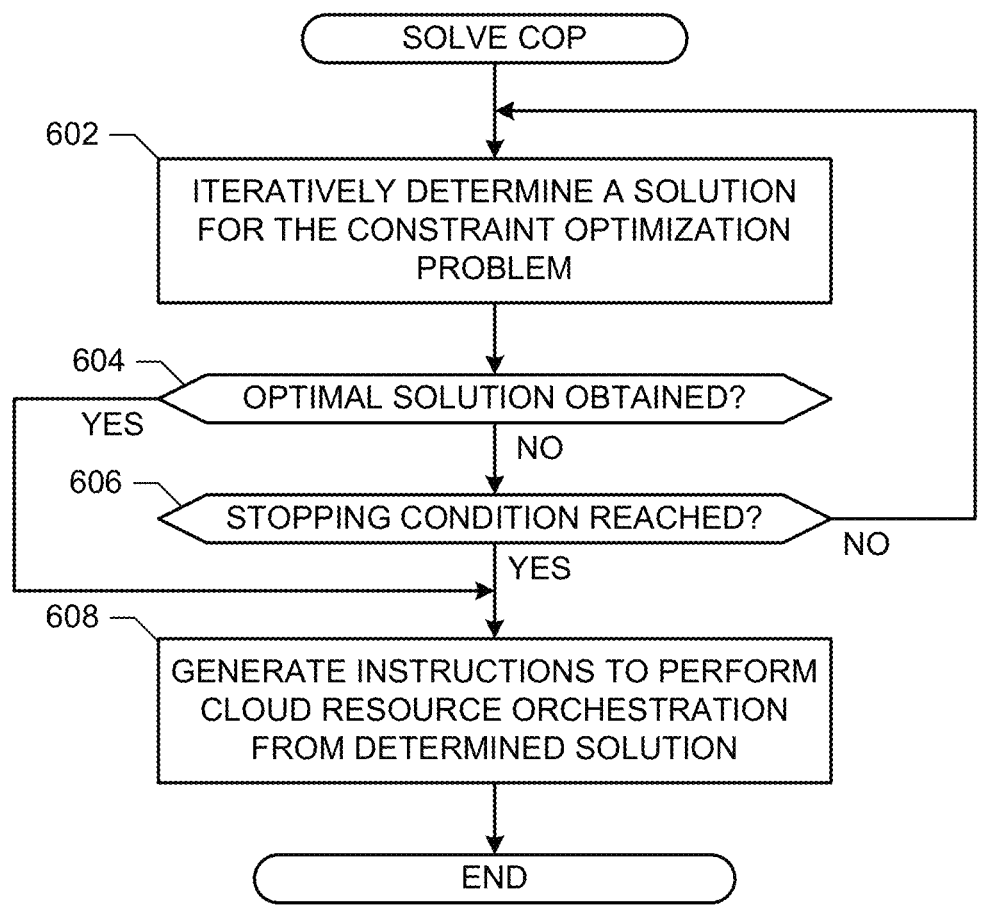
FIG. 6 is a flowchart representative of example machine readable instructions that may be executed to solve a constraint optimization problem for cloud resource orchestration.

Flowcharts representative of example machine readable instructions for implementing the example COPE nodes 104, 204, 206 of FIGS. 1 and 2 are shown in FIGS. 4-6. In these examples, the machine readable instructions comprise program(s) for execution by a processor such as the processor 712 shown in the example processor platform 700 discussed below in connection with FIG. 7. The program may be embodied in software stored on a tangible computer readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program(s) are described with reference to the flowcharts illustrated in FIGS. 4-6, many other methods of implementing the example COPE nodes 104, 204, 206 of FIGS. 1 and 2 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 4 is a flowchart representative of example machine readable instructions 400 that may be executed to provide cloud resource orchestration. The example instructions 400 of FIG. 4 may be used to implement the example cloud resource orchestration systems 102, 202 of FIGS. 1 and 2 in a centralized or distributed cloud deployment. The example instructions 400 may be executed when, for example, a COPE node (e.g., the COPE nodes 104, 204, 206 of FIGS. 1 and 2) is to evaluate a status of a cloud deployment. The instructions 400 will be described below with reference to the cloud orchestration system 102 of FIG. 1. However, the description is applicable to other cloud orchestration systems including, for example, the system 202 of FIG. 2.

The example instructions 400 of FIG. 4 begin by receiving (e.g., at the declarative query engine 118 of FIG. 1) one or more state(s) of a cloud deployment (block 402). The state(s) may include a CPU load of a data center, memory usage of a data center, network traffic statistics of a data center, and/or any other measure of a cloud deployment state. The example declarative query engine 118 receives one or more goal(s) for the cloud deployment (block 404). For example, the goal(s) may include attaining a certain level of performance of one or more data centers and/or host physical machines, such as average CPU load, standard deviation of CPU load, average memory usage, number of VMs per host physical machine, etc. The declarative query engine 118 receives one or more rule(s) and one or more constraint(s) for the goal(s) (block 406). Example constraints may be based on a customer SLA (e.g., the customer SLAs 126 of FIG. 1). Example rules may include definitions of elements in the goal(s) and/or the constraint(s). In the example of FIG. 1, the goal(s), rule(s), and constraint(s) are expressed using a declarative policy language such as COPElog.

The example declarative query engine 118 of the illustrated example converts the rule(s), constraint(s), and/or goal(s) to a constraint optimization problem (block 408). For example, the declarative query engine 118 converts the COPElog statements, such as the statements in Program 1 described above, to a COP program, such as the statements in Program 2 described above. In some examples, the COP program is provided to directly the solver 118 while in other examples the COP program is stored for later use.

The example solver 116 of FIG. 1 determines whether it is to solve the constraint optimization problem (block 410). For example, the solver 116 may be programmed to evaluate or solve the COP problem periodically, aperiodically, and/or on request. When the solver 116 is to solve the constraint optimization problem (block 410), the example solver 116 solves the constraint optimization problem (block 412). For example, the solver 116 of FIG. 1 uses the state(s) of the cloud deployment and the COP program generated by the declarative policy engine 118 to determine a preferred (e.g., optimal or best) solution. In some examples, the solver 116 may not obtain the optimal solution and, instead, obtains a preferred but suboptimal solution to the COP problem. In some examples, the solver 116 obtains an optimal solution. Examples of instructions to perform block 412 are described below with reference to FIGS. 5 and 6.

After the solver 116 solves the constraint optimization problem (block 412), the example cloud orchestrator 106 generates cloud orchestration rule(s) to implement the solution (block 414). For example, the solver 116 provides the solution to the cloud orchestrator 106. The solution may be in the form of identifiers of VMs to be migrated and/or migration destinations. The example cloud orchestrator 106 of FIG. 1 generates commands (e.g., VM migration commands to migrate VMs) to modify the cloud deployment in accordance with the solution. The example instructions 400 may then end and/or iterate to perform further cloud orchestration.

FIG. 5 is a flowchart representative of example machine readable instructions 500 that may be executed to solve a localized COP problem for cloud resource orchestration. The example instructions 500 of FIG. 5 may be used to implement the solvers 216, 228 of FIG. 2 to perform block 412 of FIG. 4. In the example of FIG. 5, the COP problem generated by the example block 408 of FIG. 4 is a localized COP problem for use in a distributed cloud orchestration system such as the example system 202 of FIG. 2. The example instructions 500 will be described below with reference to the example system 202 of FIG. 2, including the data centers 208, 210, the solvers 216, 228, the cloud orchestrators 224, 236 and, more generally, the COPE nodes 204, 206 of FIG. 2.

As mentioned above, the example instructions 500 enter from block 410 when the solver (e.g., the solver 216 of FIG. 2) is to solve the localized COP. The example solver 216 selects a neighboring COPE node (e.g., the COPE node 206 corresponding to the data center 210 neighboring the data center 208) (block 502). For example, the solver 216 may select the COPE node 206 pseudorandomly from a number of neighboring COPE nodes. The solver 216 of this example determines whether the selected COPE node 206 is the master of the link between the COPE nodes 204, 206 (block 504). For example, the master of the link may be determined as the COPE node 204, 206 having a higher (or lower) value for an identification number, IP address, and/or any other unique or semi-unique value of the COPE nodes 204, 206. If the selected COPE node 206 is not the master, then the selecting COPE node 204 is the master.

If the selected COPE node 206 is not the master (block 504), the solver 216 of the illustrated example receives system state(s) from the selected COPE node 206 (block 506). For example, the selected COPE node 206 may provide CPU load(s), memory usage, network communication(s), and/or other information regarding the host physical machines in the data center 210 corresponding to the COPE node 206. The selecting COPE node 204 aggregates the received system state(s) with the system state(s) of the data center 208 corresponding to the COPE node 204. For example, the solver 216 may store the system state(s) received from the COPE node 206 in the storage 218 to be used in solving the localized COP. The example solver 216 proceeds to solve the localized COP problem using the aggregated system state(s) (block 510). The solver 216 provides the solution(s) to the selected COPE node 206 (block 512). In some examples, the solution(s) are representative of VM migration proposals and/or commands to be performed at the data center 210.

If the selected COPE node 206 is the master of the link (block 504), the example COPE node sends system state(s) (e.g., state(s) of the data center 208) to the selected COPE node 206 (block 514). In the example of FIG. 5, the COPE node 204 performs the example blocks 506-512. The example COPE node 204 receives solution(s) from the selected COPE node 206 (block 516).

After providing the solution(s) to the selected COPE node 206 (block 512) or receiving the solution(s) from the selected COPE node 206 (block 516), the example COPE node 204 determines whether all links with neighboring data centers (e.g., data centers 210, 212) have been assigned values (block 518). If not all links have been assigned values (block 518), the example COPE node 204 determines whether a stopping condition has been reached (block 520). If the stopping condition has not been reached (block 520) (and there are links to be assigned values), control returns to block 502 to select a neighboring COPE node 206. If all links have been assigned value (block 518) or a stopping condition has been reached (block 520), the example cloud orchestrator 224 generates instructions to perform cloud resource orchestration from solution(s) (block 522). For example, the COPE node 204 may generate the instructions using the best solutions (e.g., optimal solution(s)) determined by the solver(s) 216, 228 prior to a stopping condition being reached. The example instructions 500 of FIG. 5 may end and return control to block 414 of FIG. 4.

FIG. 6 is a flowchart representative of example machine readable instructions 600 that may be executed to solve a constraint optimization problem for cloud resource orchestration. The example instructions 600 of FIG. 6 may be used to implement the solver 116 of FIG. 1 and/or to perform block 412 of FIG. 4. In the example of FIG. 6, the COP problem generated by the example block 408 of FIG. 4 is a centralized COP problem for use in a centralized cloud orchestration system such as the example system 102 of FIG. 1. The example instructions 600 will be described below with reference to the example system 102 of FIG. 1, including the data centers 110, 112, 114, the solver 116, the cloud orchestrator 106 and, more generally, the COPE node 104 of FIG. 1.

As mentioned above, the example instructions 600 enter from block 410 when the solver (e.g., the solver 116 of FIG. 1) is to solve the COP. The example solver 116 iteratively determines a solution for the COP (block 602). For example, the solver 116 uses a COP solver such as Gecode to solve the COP. The solver 116 determines if an appropriate solution has been obtained (e.g., after each iteration of solving the COP) (block 604). In some examples, the solver 116 does not determine that an appropriate solution has been reached until at least a threshold number of COP iterations has occurred. If an appropriate solution (e.g., an optimal solution) has not been obtained (block 604), the example solver 116 determines whether a stopping condition has been reached (block 606). For example, a stopping condition may include a processing the COP for a threshold amount of time.

If an appropriate solution has not yet been obtained (block 604) and a stopping condition has not been reached (block 606), control returns to block 602 to continue seeking a solution for the constraint optimization problem. If an appropriate solution (e.g., an optimal solution) has been obtained (block 604) or a stopping condition has been reached (block 606), the example cloud orchestrator 106 of FIG. 1 generates instructions to perform cloud resource orchestration based on the determined solution (block 608). For example, if an appropriate solution has been obtained the solver 116 provides the appropriate solution to the cloud orchestrator 106. If a stopping condition has been reached prior to obtaining an optimal solution, the solver 116 may provide the best solution obtained at the time of the stopping condition. Example cloud resource orchestration instructions generated by the cloud orchestrator 106 may include VM migration instructions to migrate one or more VMs between host physical machines and/or data centers. After generating the instructions (block 608), the example instructions 600 of FIG. 6 may end and return control to block 414 of FIG. 4.

Figure 7:
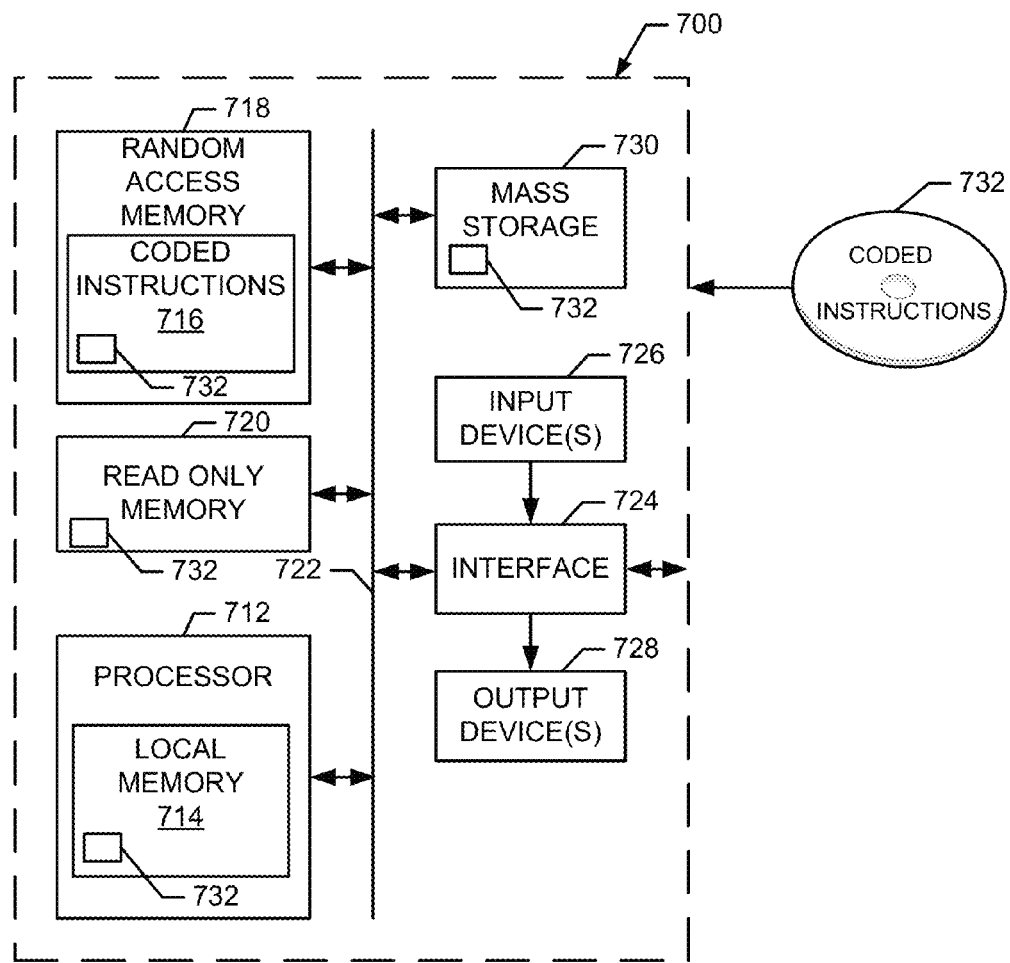
FIG. 7 is a block diagram of an example processing system that may execute the example machine readable instructions of FIGS. 4-6 to implement the example cloud resource orchestration systems of FIGS. 1 and 2.

FIG. 7 is a block diagram of an example processing system 700 capable of implementing the systems, methods, apparatus, and/or articles of manufacture disclosed herein. The processing system 700 can be, for example, a server, a personal computer, a router, an Internet appliance, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, the machine readable instructions represented in FIGS. 4-6. The processor 712 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device (s) 726 can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing machine readable instructions and data. Examples of such mass storage devices 730 include floppy disk drives, hard drive disks, compact disk drives and digital versatile disk (DVD) drives.

The coded instructions 732 of FIG. 7 may be stored in the mass storage device 730, in the volatile memory 718, in the non-volatile memory 720, in the local memory 714 and/or on a removable storage medium, such as a CD or DVD 732.

At least some of the above described example methods and/or apparatus are implemented by one or more software and/or firmware programs running on a computer processor. However, dedicated hardware implementations including, but not limited to, application specific integrated circuits, programmable logic arrays and/or other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

Example systems, methods, and/or articles of manufacture disclosed herein provide effective cloud resource orchestration that can be adapted to particular customer goals and/or constraints. Example systems, methods, and/or articles of manufacture disclosed herein integrate a distributed query engine with a constraint solver to enable effective distributed cloud deployments that can use multiple cloud service providers while efficiently and effectively orchestrating resources to improve service for customers. Example systems, methods, and/or articles of manufacture disclosed herein reduce costs and/or improve infrastructure utilization by automatically orchestrating cloud resources according to policies established by cloud service provider(s).

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example systems, methods, and articles of manufacture have been described herein, the scope of coverage of this patent is not limited thereto. On the contrary, this patent covers all systems, methods, and articles of manufacture fairly falling within the scope of the claims either literally or under the doctrine of equivalents.

What is claimed is:

1. A method comprising:
   converting, by a processor of a first node associated with a first data center, a plurality of constraints and a goal for a cloud deployment that are expressed in a plurality of statements of a first program expressed using a declarative policy language into a constraint optimization problem expressed in a second program, the plurality of constraints comprising a constraint that restricts an allowed value of a predicate, wherein the constraint represents an invariant that is to be maintained at all times;
   selecting, by the processor of the first node, a second node associated with a second data center neighboring the first data center;
   determining, by the processor of the first node, that the first node is a master of a link between the first node and the second node;
   based on determining that the first node is the master of the link between the first node and the second node, receiving, by the processor of the first node from the second node, a first system state of the second data center associated with the second node;
   aggregating, by the processor of the first node, the first system state of the second data center associated with the second node with a second system state of the first data center associated with the first node to form an aggregated system state; and
   calculating, by the processor using the aggregated system state, a solution for the constraint optimization problem for use in performing cloud resource orchestration for the cloud deployment.

2. The method of claim 1, wherein determining that the first node is the master of the link between the first node and the second node comprises determining that the first node is associated with a first identification value that is higher than a second identification value associated with the second node.

3. The method of claim 1, wherein converting the plurality of constraints comprises generating a rule from the plurality of constraints.

4. The method of claim 1, wherein the cloud deployment comprises a plurality of interconnected data centers, the plurality of interconnected data centers comprising the first data center and the second data center.

5. The method of claim 1, wherein the constraint optimization problem is a local constraint optimization problem corresponding to a portion of the cloud deployment.

6. The method of claim 1, further comprising sending the solution to the second node.

7. The method of claim 1, further comprising:
   generating instructions to perform the cloud resource orchestration for the cloud deployment based on the solution for the constraint optimization problem; and
   providing, by the processor of the first node to the second node, the instructions to perform the cloud resource orchestration.

8. The method of claim 1, further comprising sending the solution to the second node to be converted into an iterative constraint optimization problem.

9. A first node of a cloud orchestration system comprising:
   a processor; and
   a memory that stores instructions which, when executed by the processor, cause the processor to perform operations comprising
      converting a plurality of constraints and a goal for a cloud deployment that are expressed in a plurality of statements of a first program expressed using a declarative policy language into a constraint optimization problem expressed in a second program, the plurality of constraints comprising a constraint that restricts an allowed value of a predicate, wherein the constraint represents an invariant that is to be maintained at all times, and wherein the first node is associated with a first data center,
      selecting a second node associated with a second data center neighboring the first data center,
      determining that the first node is a master of a link between the first node and the second node,
      based on determining that the first node is the master of the link between the first node and the second node, receiving, from the second node, a first system state of the second data center associated with the second node,
      aggregating the first system state of the second data center associated with the second node with a second system state of the first data center associated with the first node to form an aggregated system state, and calculating, using the aggregated system state, a solution to the constraint optimization problem for use in performing cloud resource orchestration for the cloud deployment.

10. The first node of claim 9, wherein the constraint of the plurality of constraints is based on a customer service level agreement.

11. The first node of claim 9, wherein the first node corresponds to a first location, and wherein converting the plurality of constraints and the goal into the constraint optimization problem comprises converting the plurality of constraints and the goal into a local constraint optimization problem.

12. The first node of claim 9, wherein the operations further comprise sending the solution to the second node.

13. The first node of claim 9, wherein determining that the first node is the master of the link between the first node and the second node comprises determining that the first node is associated with a first identification value that is higher than a second identification value associated with the second node.

14. The first node of claim 9, further comprising a storage device that performs storage device operations comprising:
receiving at least one of the plurality of constraints or the goal as a constraint optimization problem rule; and
providing the constraint optimization problem rule to the processor.

15. The first node of claim 9, wherein the operations further comprise using a calculated solution as the solution to the constraint optimization problem in response to a stopping condition being present.

16. A non-transitory computer readable medium comprising computer readable instructions which, when executed by a processor of a first node, cause the processor to perform operations comprising:
converting a plurality of constraints and a goal for a cloud deployment that are expressed in a plurality of statements of a first program expressed using a declarative policy language into a constraint optimization problem expressed in a second program, the plurality of constraints comprising a constraint that restricts an allowed value of a predicate, wherein the constraint represents an invariant that is to be maintained at all times, and where the first node is associated with a first data center;
selecting a second node associated with a second data center neighboring the first data center;
determining that the first node is a master of a link between the first node and the second node;
based on determining that the first node is the master of the link between the first node and the second node, receiving, from the second node, a first system state of the second data center associated with the second node;
aggregating the first system state of the second data center associated with the second node with a second system state of the first data center associated with the first node to form an aggregated system state; and
calculating a solution for the constraint optimization problem for use in performing cloud resource orchestration for the cloud deployment.

17. The non-transitory computer readable medium of claim 16, wherein the cloud deployment comprises a plurality of interconnected data centers, the plurality of interconnected data centers comprising the first data center and the second data center.

18. The non-transitory computer readable medium of claim 16, wherein the constraint optimization problem is a local constraint optimization problem corresponding to a portion of the cloud deployment.

19. The non-transitory computer readable medium of claim 16, wherein the operations further comprise:
generating instructions to perform the cloud resource orchestration for the cloud deployment based on the solution for the constraint optimization problem; and
providing, by the processor of the first node to the second node, the instructions to perform the cloud resource orchestration.

20. The non-transitory computer readable medium of claim 16, wherein determining that the first node is the master of the link between the first node and the second node comprises determining that the first node is associated with a first identification value that is higher than a second identification value associated with the second node.

* * * * *